UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

PLASTIC PHENOLIC CONDENSATION PRODUCT AND PROCESS OF FORMING SAME.

1,020,594. Specification of Letters Patent. Patented Mar. 19, 1912.

No Drawing. Continuation of application Serial No. 496,060, filed May 14, 1909. This application filed June 2, 1911. Serial No. 630,893.

*To all whom it may concern:*

Be it known that I, JONAS W. AYLSWORTH, a citizen of the United States, and a resident of East Orange, in the county of Essex and State of New Jersey, have invented certain new and useful Plastic Phenolic Condensation Products and Process of Forming Same, of which the following is a description.

My invention relates to compositions for molding various articles, such as may be made from celluloid, hard rubber and kindred substances and to the process for forming the same.

My object is to produce a composition of this class, the same being an infusible condensation product of a phenol and a substance containing the methylene radical, and to devise a method for preparing the same, all as will be hereinafter more fully described in the following specification and pointed out in the appended claims.

My improved composition contains an ingredient of the class and having the functions to be hereinafter specified, the resulting composition having the property of becoming sufficiently plastic when heated to the requisite temperature to be readily pressed to shape in dies or molds.

This application is a continuation as to certain features thereof of my application, Ser. No. 496,060, filed May 14, 1909, entitled "Composition and process of manufacturing the same."

In my application, Ser. No. 496,060, referred to, I describe the formation of a synthetic fusible resin, which I term a "phenol resin" and the formation of an infusible ultimate phenolic condensation product. The phenol resin referred to is formed by reaction between definite amounts of phenol and formaldehyde, or equivalents, in such a manner that the formaldehyde is all combined with the phenol and the phenol is all combined with the formaldehyde or there is a certain small and ascertainable amount of phenol in the product uncombined with the formaldehyde. The phenol resin is also preferably rendered completely anhydrous as described in the said application, by being heated to a temperature of about 400° F., after its formation for a sufficient length of time to remove not only all of the free water contained in the product, but also all of the water which may be contained therein in combined form prior to such dehydration.
The ultimate infusible product referred to is formed preferably by incorporating an amount of anhydrous formaldehyde, such as tri-oxymethylene with the phenol resin described, and heating the same to cause reaction between the added formaldehyde element and the phenol resin, to form the desired infusible product. In this process the added formaldehyde element is used in a definite proportion calculated to be the correct proportion to exactly combine with the phenol resin without excess, so that in the ultimate product obtained all of the phenol and formaldehyde are entirely combined. The proportion of the formaldehyde element added varies somewhat because of the variable quantity of uncombined phenol in the phenol resin, the preferable amount of added formaldehyde element being stated in my application referred to, to be from 5 to 7½ per cent. of the weight of the phenol resin. If desired, an amount of added formaldehyde may be used which is somewhat less than the proportion required to combine with all of the phenol resin so that there is some excess of phenol resin in the ultimate infusible product, which acts as a desirable solid solvent for the mass. Or, instead of incorporating the phenol resin described with the added formaldehyde, other substances of the same general character as the phenol resin may be used in incorporation with the added formaldehyde element, such substances being of the class well known as "shellac substitutes", the amount of added formaldehyde being calculated with regard to the proportions of free phenols in the shellac substitute used. When the process is carried on in the preferable manner and under proper temperature conditions, the hardening reaction of the fusible condensation product and the added formaldehyde element may be carried out without the use of counteracting pressure and without the evolution of bubbles which would render the mass porous. As stated in the said application the baking temperature used may be about 260° F. which may subsequently be raised to 350° F.

The process of forming the ultimate infusible product referred to or a similar ultimate infusible product, may be modified, as is explained in my pending application, Ser.

No. 543,238, filed Feb. 11, 1910, entitled "Phenolic condensation product and method of preparing same." The process as described in the last named application, consists in incorporating hexa-methylene-tetra-amin with the phenol resin described or with a similar substance of the shellac substitute class, and heating the same sufficiently to cause the hardening reaction to ensue and the desired infusible mass accordingly to be formed. The hexa-methylene-tetra-amin or similar methylene amin compound is, for many purposes, superior to the polymerized formaldehyde described in application Ser. No. 496,060, referred to, for addition to the phenol resin for hardening the mass, for a number of reasons. It has no tendency to cause foaming of the mass even if an excess of methylene-amin is used, above the amount which I have discovered to be necessary to combine with all of the phenol resin to harden the same. Another advantage of the methylene-amin compound over the paraformaldehyde or other form of formaldehyde for the function referred to, is that it will cause a hardening of the mass at a much lower temperature than will the paraformaldehyde. The proportion of hexa-methylene-tetra-amin which should be used, varies in accordance with the composition of the phenol resin, from $7\frac{6}{10}$ to 12 parts of hexa-methylene-tetra-amin, being the usual limits between which the amount of hexa-methylene-tetra-amin to be combined with 100 parts of phenol resin may vary. The reaction preferably being carried on at a temperature of about 220° F.

The apparent constitution of the particular phenol resin described in my application, Ser. No. 496,060, referred to is, as is stated in my application 543,238, referred to,

That is, approximately two parts of formaldehyde are caused to combine with three parts of phenol by molecular weight, with the evolution of two molecules of water. The infusible product described in my application Ser. No. 496,060, is apparently $6(C_6H_4OCH_2)_3$, six molecules of water also being formed. In the reaction as described in my application, Ser. No. 543,238, in which hexa-methylene-tetra-amin is used in place of a form of formaldehyde, the ultimate product formed is apparently the same except that four molecules of ammonia are formed in place of the six molecules of water. In the case of this latter product, the ammonia formed may, in some cases, be driven off by heat in whole or in part. Or it may be combined with an added ingredient of the mass one of the functions of which is to fix the ammonia and render the same harmless in the product formed. Substances which I find as a class to be satisfactory for the purpose of combining the ammonia, are the organic acid anhydrids of which in my application, Ser. No. 543,238, benzoic and phthalic anhydrids, and the higher members of the series $C_nH_{2n}O_2$, or the acetic series, as it is called, are particularly mentioned. The action of any of these substances is to combine with the ammonia evolved in the reaction and form acid amids which remain in the product as a desirable solid solvent of the same.

It is desirable in the case of the infusible product described in either application to add to the reacting mass an ingredient of the class which I term "final product solvents". By this term I include only substances which will dissolve the ultimate condensation product or combine therewith at the baking temperature, render it plastic at such temperature and remain as a part of the product in the condition of solid solution. Various examples of substances of this class are given in both of my applications referred to. My present application is particularly directed to the ultimate condensation product formed when a suitable organic acid or its anhydrid is the final product solvent element used. Examples of particularly effective members of this class are phthalic acid and its anhydrid and benzoic acid and its anhydrid. The anhydrids mentioned and other organic anhydrids which are soluble in and miscible with the mass and are not decomposed at temperatures used, not only act as solvent elements for the ultimate product but have the further function of combining with traces of water present in or evolved from the mass during the baking operation, to form the corresponding acid, such as phthalic acid or benzoic acid, which are desirable solid solvent elements of the mass.

Benzoic and phthalic acids and their anhydrids are, as stated, particularly efficient for the purposes desired, because of useful qualities they possess, not possessed by organic acids and anhydrids in general, whereby they impart to the ultimate condensation product formed certain desirable properties, for example, giving the ultimate product a toughness like that of celluloid. Furthermore, they are either very difficultly water soluble, or are insoluble in water. Benzoic acid is very slightly soluble and is entirely insoluble when in the ultimate hardened product. Benzoic anhydrid is insoluble in water. Phthalic acid and anhydrid are both of very slight solubility in water, and are entirely insoluble when incorporated in the ultimate hardened product, as described. None of these substances are volatile at ordinary temperatures.

When hexa-methylene-tetra-amin is used as the hardening ingredient of the mass, the organic acid anhydrid used, has, as stated, a third function of combining with the ammonia evolved to form an acid amid which makes a desirable solvent element for the mass. If tri-oxymethylene or other form of formaldehyde is used as the hardening agent, the acid anhydrid combines with the traces of water evolved or present in the mass to form a corresponding organic acid, in whole or in part, which is a desirable final product solvent element. I have found that the solvent elements referred to, especially phthalic acid and anhydrid and benzoic acid and anhydrid, are especially efficacious for still another reason in that when they are used the baking reaction may be carried on at a lower temperature than when they are not present in the mass, or when other final product solvent elements, such for example, as naphthalene and some of its derivatives, are used. In the case of benzoic and phthalic acids and their anhydrids, the final hardening reaction may be carried on at the temperature of the water bath, say 205° F., whereas in the process described, reaction will not ensue except with very prolonged heating, at such low temperatures, if one of the acids or anhydrids referred to is not used. If certain accelerating or condensing agents are incorporated with the mass, as stated in my application, Ser. No. 496,060, the temperature of reaction and the time required therefor may be lowered considerably below 250° F., when the organic acids or anhydrids referred to are not used, but by the use of one of these acids or anhydrids the temperature and time required may be lowered as noted without the use of an added catalytic or condensing agent.

The organic acid anhydrid, if the anhydrid is used, should be incorporated with the mass in sufficient proportion to perform the solid solvent or plasticity function referred to, to combine with all of the water present in or evolved in the mass during the reaction, and to combine with all of the ammonia evolved in the case of the product in which hexa-methylene-tetra-amin is used. This proportion can readily be calculated. If the phenol resin described is used as an ingredient and is completely dehydrated, and an anhydrous formaldehyde such as tri-oxymethylene is used, the only water to be combined is the small amount evolved during the reaction between the phenol resin and the added formaldehyde. If ingredients which are not completely anhydrous are used, the proportion of the anhydrid should be sufficient to take care of the water contained in the ingredients. If the anhydrid is present in greater proportion than that necessary to combine the water, part of it will be changed into the acid and part will remain as an anhydrid. In masses such as described, the anhydrid element may vary between 1 and 40 per cent. of the phenol resin by weight. The amount of whatever anhydrid is used depends more or less upon the molecular weight of the particular anhydrid used, and also on the physical properties which it is desired to give the product.

The ultimate condensation product formed will soften sufficiently when heated to a temperature of between 240° F. and 350° F. to be readily shaped in any desired manner in dies or molds, while at the same time it remains infusible at any temperature lower than that of its decomposition. That is, the product will not flow or become liquid when heated to any temperature without the application of pressure. The product is also tougher and less brittle in texture than substances previously known in the art, because of the presence of the solvent element and also because no condensing or catalytic agent is employed in the process in the formation of the mass as preferably carried out.

If desired, additional final product solvent elements may be incorporated with the mass together with the organic acid or anhydrid, also the organic acid or anhydrid may be incorporated with the reacting ingredients of phenol-methylene condensation products in processes other than that to which I have specifically referred, with desirable effects.

While the organic acid anhydrids have been referred to particularly, because of their possession of the property of combining water in addition to their other useful properties, I find that the corresponding acids are very effective as ingredients in the mass, particularly benzoic acid.

When an anhydrid as phthalic or benzoic anhydrid is used in a mass formed with hexa-methylene-tetra-amin, part of the anhydrid will be changed into an acid amid by combination with the ammonia evolved from the hexa-methylene-tetra-amin, and part may combine with the free phenol in the phenol resin, if there is any free phenol therein, to form a phenyl ester. Part of the anhydrid will be changed to the corresponding acid by combination with water, if there is any water in the mass, and part will remain as anhydrid, if a sufficient amount of anhyrid is used. All of these substances are desirable final product solvent ingredients in the mass. If a polymerized formaldehyde is used as the hardening agent, in place of hexa-methylene-tetra-amin, and an acid anhydrid is used in sufficient quantity, a phenyl ester and an organic acid may be formed correspondingly, with part of the anhydrid remaining as such, all of the substances being retained in the mass as solid solvents.

In referring to hexa-methylene-tetra-amin, it is to be understood that I may use the product obtained by reacting upon aqueous solutions of ammonia with formaldehyde or polymers thereof, which product may contain other methylene-amins, as explained in my application, Ser. No. 543,238, above referred to. Also I may incorporate well known filling bodies and pigments with the mass, if desired.

I claim and desire to obtain by Letters Patent the following:

1. As a new composition of matter, a solid solution of a phenol-formaldehyde condensation product, and phthalic acid or anhydrid.

2. As a new composition of matter, a solid body which is infusible but readily plastic at from 240° F. to 350° F. which body comprises a phenolic condensation product containing in solid solution an organic acid or its anhydrid which anhydrid has the property of combining with water in the mass at elevated temperatures to form the corresponding acid substantially as described.

3. As a new composition of matter, a solid solution of a phenolic ultimate infusible insoluble condensation product and phthalic acid or anhydrid.

4. As a new composition of matter, a hard infusible condensation product of a fusible anhydrous phenol resin and an anhydrous methylene containing substance in solid solution with an organic acid anhydrid which is soluble in the mass, renders the latter plastic at elevated temperatures, and combines with any water present or evolved at such temperatures to form an organic acid.

5. The process of forming an anhydrous plastic composition which consists in incorporating together fusible phenol resin, a methylene-containing hardening agent therefor and a suitable amount of phthalic anhydrid, and heating the mass sufficiently to cause a hardening reaction to ensue, whereby any water evolved combines with the anhydrid and the mass is rendered infusible.

6. The process of forming an anhydrous plastic composition which consists in incorporating together a fusible phenol resin, a methylene-containing hardening agent therefor and a suitable amount of such an anhydrid of an organic acid as will act as a water-absorbing and final product solvent element, and heating the mass sufficiently to cause a hardening reaction to ensue, whereby any water evolved combines with the anhydrid, and an infusible hard product, containing an organic acid in solid solution therein, is formed.

7. The process of forming a plastic composition which consists in incorporating with a fusible phenol resin from 5 to 7½ per cent. of a polymerized formaldehyde, together with such an anhydrid of an organic acid as will act as a water-absorbing and final product solvent element and heating the mass sufficiently to transform it into a hard infusible product.

8. In a process for forming an anhydrous, ultimate, infusible phenolic condensation product in which a hardening reaction between phenolic and methylene-containing substances is caused by application of heat, the step which consists in adding to the ingredients of the composition before the hardening reaction a quantity of an organic anhydrid soluble in the reaction mass and calculated to be sufficient to combine with all water evolved during said reaction to form an organic acid within the mass.

This specification signed and witnessed this 22d day of May 1911.

JONAS W. AYLSWORTH.

Witnesses:
DYER SMITH,
ANNA R. KLEHM.